United States Patent Office 3,495,458
Patented Feb. 17, 1970

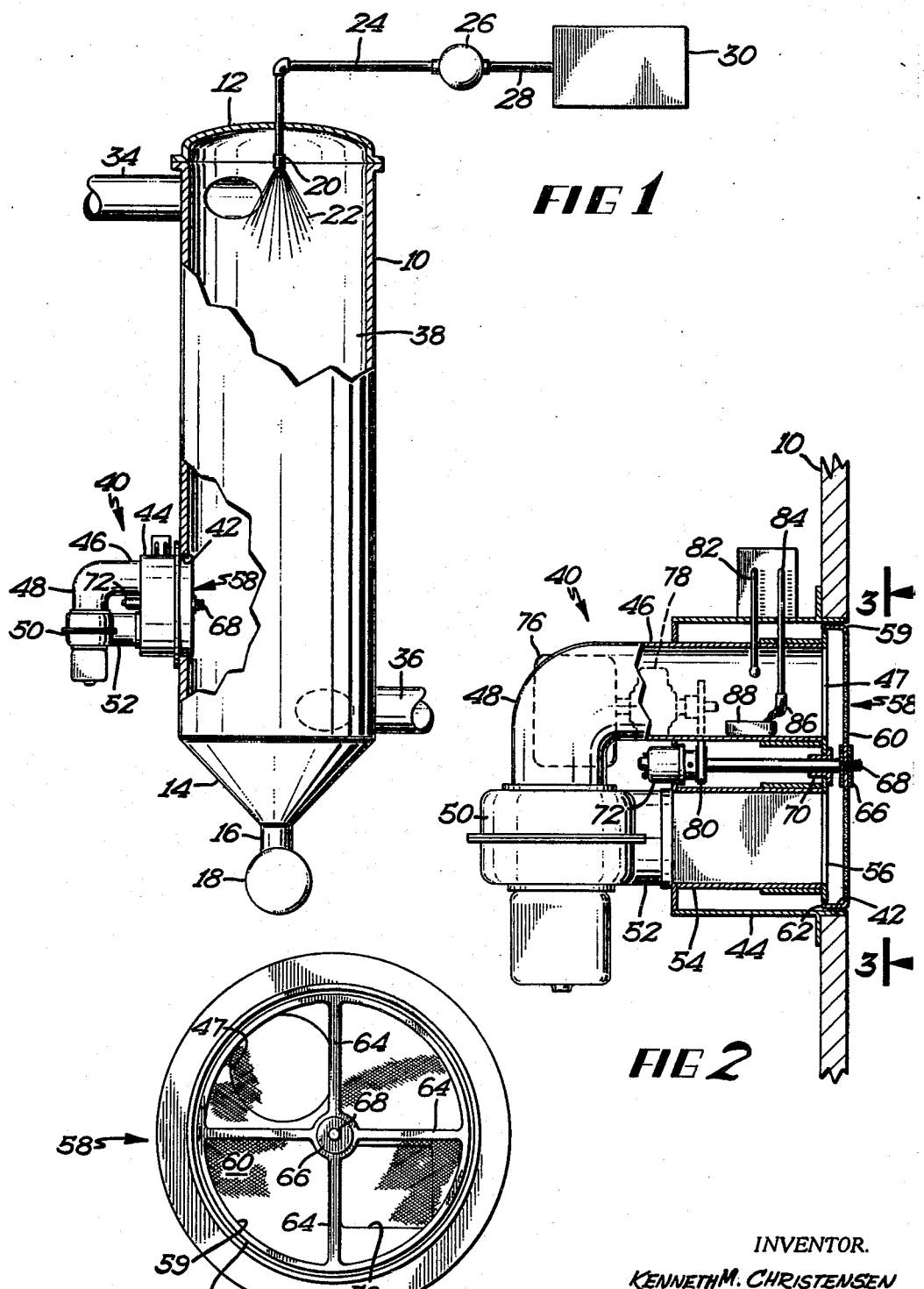

3,495,458
CONTINUOUS SAMPLING GAS TESTING APPARATUS FOR USE IN DUSTY ATMOSPHERES
Kenneth M. Christensen, Hopkins, Minn., assignor to The Pillsbury Company, Minneapolis, Minn., a corporation of Delaware
Filed Nov. 20, 1967, Ser. No. 684,352
Int. Cl. G01n 25/56
U.S. Cl. 73—338.6    4 Claims

ABSTRACT OF THE DISCLOSURE

A gas sampling apparatus for measuring the humidity of the dusty atmosphere in a chamber. A blower removes the atmosphere from the chamber through an inlet duct blows it past the psychrometer and returns it to the chamber through an outlet duct. A pivoted disc filter is rotated past both the inlet and outlet so that dust which is filtered from the atmosphere as it enters the inlet is blown free of the filter as the atmosphere is returned to the chamber.

---

The present invention relates to measuring and testing equipment and more particularly to an apparatus employed for sampling and testing a dust-containing atmosphere.

In a variety of chemical processes including the spray drying of liquids among others, it is desirable to continuously measure operating conditions such as the temperature and humidity of a gaseous atmosphere. The successful performance of this function is complicated greatly by the dust present in the atmosphere.

In the past it has been the practice to introduce a test probe (either a thermometer or psychrometer) and to periodically remove it for cleaning. This is both a time-consuming and unpleasant task. It also makes continuous operation of the sensing unit impossible and as the deposits of dust accumulated on the probe, the accuracy of the reading may suffer.

The problem of taking accurate readings is particularly difficult with a psychrometer. A typical psychrometer includes in its construction an ordinary thermometer, hereinafter referred to as a dry bulb thermometer and a wet bulb thermometer; a thermometer having a porous wick element placed over its end with a water reservoir connected to the wick for keeping the bulb of the thermometer wet at all times. The latter thermometer will hereinafter be referred to as a wet bulb thermometer. The problem of maintaining accurate continuous measurements with a wet bulb thermometer is particularly difficult because of the dust accumulation on the wick element. Not only does such an accumulation interfere with the flow of moisture to the thermometer bulb, but in addition projections form which disrupt the air flow over the thermometer bulb.

The accurate continuous measurement of operating conditions such as humidity and temperature is particularly important in the dusty atmosphere of a spray dryer or agglomerator of the type from which falling particles are bonded together by exposing their surfaces to moisture in the form of a water spray or steam. In equipment of this kind, it is important that no material portion of the atmosphere present in the dryer be withdrawn. Moreover, it is important that the pressure within the dryer be unaffected by the operation of the psychrometer.

In view of these and other deficiencies of the prior art, the invention has among its objects the provision of the following characteristics and advantages in a sampling device for measuring the properties of a dusty atmosphere: (a) the ability to continuously sample the atmosphere without removing material quantities of the atmosphere or the dust from the chamber containing the atmosphere being measured; (b) the ability to make measurements without the accumulation of dust on sensing probes such as thermometer bulbs, etc.; (c) a provision for withdrawing a portion of the atmosphere being sampled without altering the pressure in the chamber from which the atmosphere is withdrawn; (d) a means for filtering dust from the atmosphere being tested with a provision for effectively preventing the filter from being obstructed.

These and other more detailed and specific objects will be apparent in view of the following specification and drawings, wherein:

FIGURE 1 is a side elevational view partly in section of a spray drying apparatus employing the present invention.

FIGURE 2 is a vertical side elevational view partly in section of the continuous sampling psychrometer in accordance with the invention on a somewhat larger scale than shown in FIGURE 1.

FIGURE 3 is a partial elevational view taken on line 3—3 of FIGURE 2.

Shown in the drawings is a spray drying apparatus comprising a vertically disposed elongated chamber or tank 10 having an upper wall 12 and a lower wall 14 which consists of a funnel-shaped collection hopper which communicates through a duct 16 with a collecting chamber 18. The liquid to be dried which ordinarily consists of an aqueous solution or suspension is expelled through a nozzle 20 as a fined spray 22. The liquid is supplied to the nozzle through a pipe 24 from pump 26 which communicates through a line 28 with a supply tank 30.

As the spray of liquid material 22 passes downwardly through the tank 10, it is dried by hot air or other heated gaseous drying medium introduced through a duct 34 and exhausted through a duct 36. The interior of the chamber 38 is thus filled with an atmosphere consisting of moist heated air or other gas containing suspended particles of partially or completely dried solids. As the droplets dry they form a fine dust that fills the chamber 10. Ordinarily the pressure in the chamber 10 will be maintained at slightly below atmospheric pressure to prevent the undesired escape of dusty material into the building in which the equipment is housed.

To accurately measure the characteristics of the drying atmosphere, a continuous sampling psychrometer 40 is mounted within a circular opening 42 in one side wall of the chamber 10.

Refer now particularly to FIGURES 2 and 3 which illustrate the continuous sampling psychrometer in accordance with the invention. As seen in the figures a cylindrical enclosure 44 is suitably secured within the opening 42 of the side wall of the dryer 10. Within the enclosure 44 is an inlet duct composed of a section of 4-inch diameter metal pipe 46 having an inlet opening 47 at its right end as seen in FIGURE 2. The pipe 46 bends downwardly at 48 and is connected at its lower end to an air blower 50 such as a MacMaster's Carr No. 1965, size 3. The outlet 52 and the blower 50 communicates through a square outlet duct or pipe 54 to an exhaust opening 56.

Mounted for rotation in the right end of the chamber 44 as seen in FIGURE 2 and communicating with both inlet and outlet openings 47 and 56 is a filter element 58 consisting of a circular supporting framework 59 and a screen element 60. The framework 59 includes a circular cylindrical flange 62 which is connected by means of spokes 64 with a hub 66 which is itself fastened to a shaft 68. The shaft 68 is mounted for rotation within journals 70 and 72 (FIGURE 2) and is rotated during operation by means of a slow speed fractional horsepower drive including a motor 76 and speed reducer 78. The speed reducer is connected to the shaft 68 by means of a belt 80 so as to drive the shaft 68 and the screen element 60 at a speed of about 10 r.p.m. Air is drawn into the inlet 47 at the speed of about 790 feet per minute (17 c.f.m.)

Suitably mounted within the chamber 44 and extending downwardly into the pipe 46 is a dry bulb thermometer 82 and a wet bulb thermometer 84, the latter including the usual moisture containing wick 86 that extends down into a suitable reservoir such as a water containing pan 88.

The operation of the apparatus will now be described. It will be assumed in the description of the operation that the spray dryer 10 is already in operation and that the liquid that is to be dried is being continuously pumped from the reservoir 30 through the nozzle 20 to form a spray 22 which dries as it falls through the hot gas in the dryer to form a cloud of finely divided suspended dust particles.

To begin the operation of the psychrometer, the pan 88 is filled and the motor 76 and blower 50 are energized. Air or other gas in the dryer is then withdrawn through the portion of the filter 58 positioned over the inlet opening 47. The dust contained in the gas is deposited on the outward surface of the filter element. The gas then passes over the dry and wet bulb thermometers 82 and 84, through the blower 50, thence through the outlet of the blower 52 and is expelled through the opening 56. The air passing out through the opening 56 flows in the reverse direction through the filter element 57 thereby effectively removing accumulated dust particles from the outward surface of the filter. As the device continues to operate, clean portions of the filter element 60 will be continuously exposed to the inlet opening 47. Accordingly, there will always be a clean section of filter element positioned over the inlet opening.

It should also be noted that the atmosphere that has been withdrawn from the drying chamber will be immediately returned to the chamber. Accordingly, none of the heated dry air or other drying gas present in the drying chamber will be lost to the atmosphere. Moreover, the desired pressure within the drying chamber will be maintained at all times. Accordingly, the taking of samples will not interfere with the operation of the dryer.

A further important benefit derived from the invention is that the wet and dry bulb thermometers 82 and 84 remain uncontaminated by dust and the dust that is deposited on the screen element 60 will be blown back into the dryer again. Thus no product will be lost during the operation.

It is apparent that many modifications and variations of this invention as hereinbefore set forth may be made without departing from the spirit and scope thereof.

I claim:

1. A continuous sampling and testing apparatus for measuring characteristics of an atmosphere in a drying chamber containing quantities of suspended dust, said apparatus comprising an inlet duct and outlet duct, a blower means for drawing the atmosphere out of the chamber through the inlet duct and for returning the atmosphere to the chamber through the outlet duct, said testing apparatus being attached to the side of the drying chamber, said inlet and outlet ducts communicating through the apparatus with the interior of the chamber, a psychrometer mounted in communication with one of the ducts and a filter element mounted over the ends of the inlet and outlet ducts and communicating with the chamber whereby the atmosphere drawn in through the inlet duct passes first through one portion of the filter element and the atmosphere that is exhausted through the outlet duct passes in the opposite direction through another portion of the filter element, a means mounting the filter element for rotation upon an axis positioned between the inlet and outlet ducts whereby each part of the filter element passes over the end of the inlet duct, thence over the end of the outlet duct and returns to the inlet duct, the dust material deposited on the surface of the filter element when it passes over the outlet duct being thereby returned to the chamber.

2. The apparatus of claim 1 wherein the drying chamber comprises a spray drier.

3. The apparatus of claim 1 wherein the filter element comprises a circular disc mounted for rotation at its center and the drive motor is connected to the disc for rotating the disc in a plane intersecting the inlet and outlet ducts.

4. A continuous sampling and testing apparatus for measuring characteristics of an atmosphere in a dust filled chamber containing quantities of suspended dust, said apparatus comprising an inlet duct and outlet duct, a blower means for drawing the atmosphere out of the chamber through the inlet duct and for returning the atmosphere to the chamber through the outlet duct, said testing apparatus being attached to the side of the dust filled chamber, said inlet and outlet ducts communicating through the apparatus with the interior of the chamber, a psychrometer mounted in communication with one of the ducts and a filter element mounted over the ends of the inlet and outlet ducts and communicating with the chamber whereby the atmosphere drawn in through the inlet duct passes first through one portion of the filter element and the atmosphere that is exhausted through the outlet duct passes in the opposite direction through another portion of the filter element, a means mounting the filter element for rotation upon an axis positioned between the inlet and outlet ducts whereby each part of the filter element passes over the end of the inlet duct, thence over the end of the outlet duct and returns to the inlet duct, the dust material deposited on the surface of the filter element when it passes over the outlet duct being thereby returned to the chamber.

References Cited

UNITED STATES PATENTS

| | | | |
|---|---|---|---|
| 2,089,627 | 8/1937 | Stephenson | 73—338.6 |
| 3,293,831 | 12/1966 | Hollyday | 55—302 |
| 3,407,570 | 10/1968 | Steinmetz | 55—302 |

S. CLEMENT SWISHER, Primary Examiner

U.S. Cl. X.R.

73—421.5